US008540885B2

(12) United States Patent
Ebert et al.

(10) Patent No.: US 8,540,885 B2
(45) Date of Patent: Sep. 24, 2013

(54) USE OF ALKOXYLATED POLYALKANOLAMINES FOR SPLITTING OIL-WATER EMULSIONS

(75) Inventors: Sophia Ebert, Mannheim (DE); Andreas Eichhorn, Ellerstadt (DE)

(73) Assignee: BASF SE (DE)

( * ) Notice: Subject to any disclaimer, the term of this patent is extended or adjusted under 35 U.S.C. 154(b) by 489 days.

(21) Appl. No.: 12/920,623

(22) PCT Filed: Feb. 27, 2009

(86) PCT No.: PCT/EP2009/052339
§ 371 (c)(1),
(2), (4) Date: Sep. 2, 2010

(87) PCT Pub. No.: WO2009/112379
PCT Pub. Date: Sep. 17, 2009

(65) Prior Publication Data
US 2011/0011806 A1     Jan. 20, 2011

(30) Foreign Application Priority Data
Mar. 4, 2008    (EP) ..................................... 08152236

(51) Int. Cl.
*C10G 33/04*     (2006.01)
*C02F 5/14*     (2006.01)

(52) U.S. Cl.
USPC .......................................... 210/708; 252/180

(58) Field of Classification Search
USPC ................. 210/702–736, 634; 252/175–181; 525/331.3, 243; 507/937
See application file for complete search history.

(56) References Cited

U.S. PATENT DOCUMENTS

| | | | |
|---|---|---|---|
| 2,407,895 A | | 9/1946 | Monson et al. |
| 4,404,362 A | | 9/1983 | Bellos |
| 4,505,839 A | | 3/1985 | Bellos et al. |
| 4,731,481 A | | 3/1988 | Bellos et al. |
| 4,840,748 A | * | 6/1989 | Bellos et al. ................... 516/139 |
| 5,393,463 A | | 2/1995 | Fikentscher et al. |
| 5,445,765 A | | 8/1995 | Elfers et al. |
| 5,846,453 A | * | 12/1998 | Mohr et al. .................... 516/171 |
| 2007/0100002 A1 | | 5/2007 | Leinweber et al. |

FOREIGN PATENT DOCUMENTS

| | | |
|---|---|---|
| CA | 2599985 A1 | 10/2006 |
| DE | 2540173 A1 | 3/1977 |
| DE | 3136281 | 3/1983 |
| DE | 3206459 | 9/1983 |
| DE | 4435688 | 4/1996 |
| DE | 10243361 A1 | 4/2004 |
| DE | 10329723 B3 | 12/2004 |
| EP | 0222587 | 5/1987 |
| EP | 0441198 A2 | 8/1991 |
| EP | 0444515 | 9/1991 |
| EP | 0541018 A2 | 5/1993 |
| EP | 1650246 | 4/2006 |
| WO | WO-2006/103251 A1 | 10/2006 |
| WO | WO-2009/060060 A1 | 5/2009 |

OTHER PUBLICATIONS

International Preliminary Report on Patentability for PCT/EP2009/052339 mailed Jun. 16, 2010.
English-language translation of International Preliminary Report on Patentability for PCT/EP2009/052339 mailed Dec. 29, 2010.

\* cited by examiner

*Primary Examiner* — Ana M. Fortuna
*Assistant Examiner* — Nader Hossaini
(74) *Attorney, Agent, or Firm* — Novak Druce Connolly Bove + Quigg LLP

(57) ABSTRACT

The use of alkoxylated polyalkanolamines as demulsifiers for splitting oil-water emulsions, especially for splitting crude oil emulsions.

20 Claims, No Drawings

USE OF ALKOXYLATED POLYALKANOLAMINES FOR SPLITTING OIL-WATER EMULSIONS

CROSS REFERENCE TO RELATED APPLICATIONS

This application is a national stage application under 35 U.S.C. §371 of PCT/EP2009/052339, filed Feb. 27, 2009, which claims benefit to European application 08152236.9, filed Mar. 4, 2008, the entire disclosures of which are hereby incorporated by reference.

The invention relates to the use of alkoxylated polyalkanolamines for splitting oil-water emulsions, especially for splitting crude oil emulsions.

When extracted, mineral oil is generally obtained as a relatively stable water-oil emulsion. According to the age and deposit, it may comprise up to 95% by weight of water. The water may firstly be water which was already present in the deposit and secondly water which is injected into the deposit through injection boreholes in the course of secondary and/or tertiary mineral oil extraction. Generally even greater amounts of salt are dissolved in the water, for example alkali metal or alkaline earth metal salts, and the emulsion typically also comprises solids which are discharged from the borehole with the oil-water emulsion. The water-oil emulsions are stabilized by natural emulsifiers which occur in the crude oil, for example, naphthenic acids. However, they can also additionally be stabilized by emulsifiers which do not occur naturally, for example, surfactants which have been introduced into the mineral oil deposit for tertiary mineral oil extraction, and are now discharged again with the oil thus extracted.

Water, salts and solids have to be removed before the crude oil is processed in a refinery. Refineries frequently require that the water content of the crude oil supplied must not be more than 1%. For economic reasons, the water and the further components are removed from the crude oil at the site of extraction in order to prevent the uneconomic transport of water and to prevent or at least to minimize corrosion problems.

The phase separation of the water-oil emulsion should be effected very rapidly and very completely. Only in this way, in view of the large conveying volumes, can the apparatus for phase separation, for example, settling tanks, be kept at a minimum size. On extraction platforms at sea, the use of very small, compact apparatus for phase separation is a necessity in construction terms in view of the limited space, and small apparatus of course generally requires lower capital costs than large apparatus. A requirement often made is that the phase separation should not take more than approx. 20 to 30 min.

It is known that emulsion splitters (demulsifiers) can be used to accelerate the phase separation of oil-water emulsions. Emulsion splitters are interface-active substances which influence the oil-water interfaces and thus contribute to more rapid phase separation.

Oil-water emulsions are frequently separated by a two-stage process with different requirements in each case. In a first stage, as outlined above, the extracted emulsion is split into an oil phase and a water phase. This typically leaves small residual amounts of water in the oil phase. Provided that the water content is below a critical limit—refineries frequently require that the water content in the crude oil supplied must not be more than 1%—this is, though, generally uncritical. The water phase may also still comprise small amounts of residual oil. Since oil-containing water cannot be disposed of uncleaned in the event of exceedance of the limits, a deoiling step usually follows in which residual amounts of oil are also removed from the water phase. For this purpose, it is also possible to use demulsifiers; in general, however, different demulsifiers are used than in the actual emulsion splitting.

It is known that polyalkanolamines can be used to separate oil-in-water emulsions, especially for deoiling.

U.S. Pat. No. 2,407,895 describes the use of polyalkanolamines for splitting oil-in-water emulsions. The polyalkanolamines are prepared by condensing secondary or tertiary amino alcohols at from 200 to 270° C., preferably in the presence of catalysts such as sodium hydroxide. The starting materials used may also be amino alcohols alkoxylated with up to 3 alkylene oxide units. The oil content in the emulsions to be separated is generally less than 1% by weight based on the emulsion.

U.S. Pat. No. 4,505,839, U.S. Pat. No. 4,731,481 and U.S. Pat. No. 4,840,748 disclose polyalkanolamines with a mean molar mass $M_n$ of from 325 to 525 g/mol and the use thereof as assistants for separating oil-in-water emulsions, especially those having an oil content of less than 1% by weight. The condensation is effected with catalysis by zinc chloride/acetic acid or aluminum sulfate/acetic acid.

U.S. Pat. No. 4,404,362 discloses block copolymers formed from ethanolamines and their use as assistants for separating oil-in-water emulsions, especially those having an oil content of less than 1% by weight.

EP 441 198 A2 discloses a preparation process for polyalkanolamines, in which the condensation is undertaken in the presence of phosphorous acid and/or hypophosphorous acid, and to their use as demulsifiers for oil-in-water emulsions. In the use example, an oil-in-water emulsion with an oil content of 430 ppm is separated.

The subsequent functionalization of polyalkanolamines intended for use as demulsifiers with particular reagents is also known. This affords terminally functionalized polyalkanolamines. DE 31 36 281 A1 discloses functionalization with bisglycidyl ethers, DE 32 06 459 A1 functionalization with xylene dichlorides, and EP 444 515 A1 discloses functionalization with urea, urea derivatives and urethanes.

However, none of the documents cited discloses alkoxylated polyalkanolamines.

Our application EP 07120393.9, which was yet to be published at the priority date of the present application, discloses alkoxylated polyalkanolamines. They are prepared by means of a two-stage process in which, in a first step, amino alcohols are condensed to give polyalkanolamines, and the resulting polyalkanolamines are alkoxylated in a second step. The use of the resulting alkoxylated polyalkanolamines to separate oil-water emulsions is not disclosed.

In addition to the requirement for rapid and complete separation, it should be taken into account that the composition of the mineral oil can vary from oilfield to oilfield and the composition of the extracted oil-water emulsion can also change in the course of time. According to the water content in the emulsion, it may be an oil-in-water or water-in-oil emulsion. It is consequently necessary to adjust the demulsifier to the particular use. Frequently, mixtures of different demulsifiers are used for this purpose.

It was an object of the present invention to provide improved demulsifiers for splitting oil-water emulsions, especially crude oil emulsions, with which more rapid phase separation can be achieved. They should be simple and inexpensive to prepare and be adjustable to different separation problems in, a simple manner.

The object is achieved through the use of alkoxylated polyalkanolamines as demulsifiers for splitting oil-water emulsions, especially for splitting crude oil emulsions.

Accordingly found has been the use of alkoxylated polyalkanolamines for splitting oil-water emulsions, which are obtainable by the following processes:

(A) condensing at least one trialkanolamine of the general formula $N(R^1—OH)_3$ (Ia) and/or at least one dialkanolamine of the general formula $R^2—N(R^1—OH)_2$ (Ib) to give a polyalkanolamine(II), where the $R^1$ radicals are each independently a divalent, linear or branched aliphatic hydrocarbon radical having from 2 to 6 carbon atoms, and the $R^2$ radicals are each hydrogen and/or linear or branched aliphatic, cycloaliphatic and/or aromatic hydrocarbon radicals having from 1 to 30 carbon atoms, (B) alkoxylating the resulting polyalkanolamine (II) with $C_2$- to $C_{12}$-alkylene oxides, with the proviso that the amount of ethylene oxide and/or propylene oxide is at least 80% by weight based on the amount of all alkylene oxides used, and where the average degree of alkoxylation is from 1 to 200 per OH group and—where present—secondary amino group.

In a preferred embodiment of the invention, the alkylene oxide is ethylene oxide and/or propylene oxide, and the polyoxyalkylene groups formed have block structure.

With regard to the invention, the following can be stated specifically:

To perform the invention, alkoxylated polyalkanolamines are used as demulsifiers to separate oil-water emulsions. It will be appreciated that it is also possible to use mixtures of a plurality of different alkoxylated polyalkanolamines.

Description of the Alkoxylated Polyalkanolamines Used

The alkoxylated polyalkanolamines used in accordance with the invention are obtainable by means of a two-stage reaction, in which, in a first reaction stage (A) at least one trialkanolamine of the general formula (Ia) and/or a dialkanolamine of the general formula (Ib) and optionally further components (Ic) having at least two hydroxyl and/or amino groups and optionally further components (Id) are reacted with one another in a polycondensation reaction to give a polyalkanolamine (II).

In a second reaction stage (B), the resulting polyalkanolamine (II) is alkoxylated to obtain an alkoxylated polyalkanolamine (III) having terminal polyalkoxy groups.

Optionally the alkoxylated polyalkanolamine (III), in a third reaction stage (C), can be reacted with functionalization reagents to obtain functionalized alkoxylated polyalkanolamines (IV).

Stage (A)

The trialkanolamines (Ia) and/or dialkanolamines (Ib) used in stage (A) have the general formulae $N(R^1—OH)_3$ (Ia) and $R^2—N(R^1—OH)_2$ (Ib).

The $R^1$ radicals are in each case independently a divalent linear or branched aliphatic hydrocarbon radical having from 2 to 6 carbon atoms, preferably 2 or 3 carbon atoms. Examples of such radicals comprise ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl, butane-2,3-diyl, 2-methylbutane-1,3-diyl, 3-methylbutane-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl. The radicals are preferably ethane-1,2-diyl, propane-1,3-diyl or propane-1,2-diyl.

The $R^2$ radical is hydrogen and/or linear or branched aliphatic, cycloaliphatic and/or aromatic hydrocarbon radicals having from 1 to 30 carbon atoms, preferably from 1 to 20 carbon atoms and more preferably from 1 to 10 carbon atoms. Aromatic radicals may of course also have aliphatic substituents. $R^2$ is preferably hydrogen or aliphatic hydrocarbon radicals having from 1 to 4 carbon atoms.

Examples of preferred trialkanolamines (Ia) comprise triethanolamine, triisopropanolamine and tributan-2-olamine, particular preference is given to triethanolamine.

Examples of preferred dialkanolamines (Ib) comprise diethanolamine, N-methyl-diethanolamine, N,N-bis(2-hydroxypropyl)-N-methylamine, N,N-bis(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine or N,N-bis(2-hydroxyethyl) aniline. Particular preference is given to diethanolamine.

In addition to the trialkanolamines (Ia) and/or dialkanolamines (Ib) it is optionally possible to use further components (Ic) having two hydroxyl and/or amino groups for the polycondensation.

In a preferred embodiment, components (Ic) are polyols of the general formula $R^3(OH)_n$, where n is a natural number from 2 to 4 and $R^3$ is an n-valent linear or branched aliphatic, cycloaliphatic or aromatic hydrocarbon radical having from 2 to 10 carbon atoms.

Examples of such polyols comprise aliphatic polyols such as ethylene glycol, propylene glycol, butylene glycol, glycerol, tri(hydroxymethyl)ethane, tri(hydroxymethyl)propane, sorbitol, neopentyl glycol or pentaerythritol, cycloaliphatic polyols such as 1,4-dihydroxycyclohexane or arylaliphatic polyols such as 1,4-bis(hydroxymethyl)benzene. The polyol is preferably glycerol.

In a further preferred embodiment, components (Ic) are polyamines of the general formula $R^4(NHR^5)_m$, where m is a natural number from 2 to 4, $R^4$ is an m-valent linear or branched aliphatic, cycloaliphatic or aromatic hydrocarbon radical having from 2 to 10 carbon atoms, and $R^5$ radicals are each independently H, a hydrocarbon radical as defined for $R^2$, where two $R^5$ radicals together may also be an alkylene group, preferably a linear 1,ω-alkylene group having from 2 to 6 carbon atoms. $R^5$ is preferably H or a methyl group.

Examples of such polyamines comprise ethylenediamine, N,N'-dimethylethylene-diamine, N,N'-diethylethylenediamine, 1,2-diaminopropane, 1,3-diaminopropane, 1,6-diaminohexane, 1,2-diaminocyclohexane, 1,3-diaminocyclohexane, 1,4-diaminocyclohexane or piperazine.

Where present, the components (Ic) having at least two hydroxyl and/or amino groups are preferably used in an amount of not more than 50% by weight based on the total amount of all components used for the condensation, i.e. (Ia) and/or (Ib), (Ic) and, if appropriate, (Id).

In addition to components (Ia) and/or (Ib) and, if appropriate, (Ic), it is optionally also possible for further components (Id) other than (Ia), (Ib) or (Ic) to be used for the condensation. They may in principle be all mono- or polyfunctional compounds which have functional groups which can react in a condensation reaction with trialkanolamines (Ia) and/or dialkanolamines (Ib). The term "condensation" shall be understood here, in a customary manner, to mean a reaction in which two functional groups form one covalent bond with elimination of a small molecule, especially water. Examples of compounds (Id) comprise carboxylic acids, especially dicarboxylic acids, which can form ester groups with the trialkanolamines (Ia) and/or dialkanolamines (Ib). Such further components can be used for fine adjustment of the properties of the alkoxylated polyalkanolamines, used in accordance with the invention. The amount of such further compounds (Ib) should, though, generally not exceed 5% by weight based on the amount of (Ia), (Ib), (Ic) and (Id). The amount is preferably less than 1% by weight, more preferably less than 0.5% by weight, and most preferably no further components (Id) are used for the condensation.

The polycondensation of components (Ia) and/or (Ib) and optionally (Ic) or (Id) can be carried out by methods known in principle to those skilled in the art while heating the components, with elimination of water. Suitable methods are disclosed, for example, by EP 441 198 A2. It will be appreciated that it is in each case also possible to use mixtures of different components (Ia), (Ib), (Ic) or (Id).

The condensation is performed typically at temperatures of from 120 to 280° C., preferably from 150 to 260° C. and more preferably from 180 to 240° C. The water formed is preferably distilled off. The reaction time is typically from 1 to 16 h, preferably from 2 to 8 h. The degree of condensation can be controlled in a simple manner through the reaction temperature and time.

The polycondensation is preferably carried out in the presence of an acid, preferably phosphorous acid ($H_3PO_3$) and/or hypophosphorous acid ($H_3PO_2$). Preferred amounts are from 0.05 to 2% by weight, preferably from 0.1 to 1% by weight, based on the components to be condensed. In addition to the acid, it is also possible to use additional catalysts, for example, zinc halides or aluminum sulfate, if appropriate in a mixture with acetic acid, as disclosed, for example by U.S. Pat. No. 4,505,839.

The viscosity of the resulting polyalkanolamines (II) is typically in the range from 1000 to 50 000 mPa·s, preferably from 2000 to 20 000 mPa·s and more preferably from 3000 to 10 000 mPa·s (each measured on the undiluted product at 20° C.).

The mean molar mass $M_n$ (number average) of the resulting polyalkanolamines (II) is typically in the range from 250 to 50 000 g/mol, preferably from 500 to 40 000 g/mol, more preferably from 1000 to 20 000 g/mol and most preferably from 2000 to 10 000 g/mol.

Stage (B)

The polyalkanolamines (II) are alkoxylated in the second step. In this step, the OH groups and any secondary amino groups present react with alkylene oxides to form terminal polyether groups.

It is possible to use $C_2$- to $C_{12}$-alkylene oxides. Examples of corresponding alkylene oxides comprise ethylene oxide and propylene oxide and also 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide or styrene oxide.

Preference is given to using ethylene oxide and/or propylene oxide. Higher alkylene oxides are generally used, at most, in small amounts for fine adjustment of the properties. In general, the amount of ethylene oxide and/or propylene oxide is at least 80% by weight, preferably 95% by weight and more preferably 95% by weight based on the sum of all alkylene oxides used.

The average degree of alkoxylation is from 1 to 200, preferably from 5 to 200, more preferably from 10 to 150, most preferably from 20 to 100 and, for example, 20 to 60 alkylene units per OH group and—where present—per secondary amino group in the starting material of the alkoxylation, i.e. the polyalkanolamine (II).

When two or more different alkylene oxides are used, the polyoxyalkylene groups formed may be random copolymers, gradient copolymers or block copolymers. They are preferably block copolymers.

In a preferred embodiment of the invention, the polyoxyalkylene groups are block copolymers, which have a block composed of ethylene oxide units and a block composed of $C_3$- to $C_{12}$ alkylene oxide units, preferably composed of polypropylene oxide units. In this case, the polyalkanolamine (II) can first be ethoxylated and then reacted with $C_3$- to $C_{12}$ alkylene oxides, or it is possible to proceed in the reverse sequence. The arrangement of the blocks can be determined by the person skilled in the art according to the desired separation problem.

In a first, particularly preferred embodiment of the, the polyether side groups are groups comprising ethylene oxide units and propylene oxide units with block structure, which have the general formula —$(CH_2CH_2O)_x(CH_2CH(CH_3)O)_yH$ where the ethylene oxide units and the propylene oxide units are also actually incorporated in this sequence, i.e. initial ethoxylation is followed by propoxylation. The polyalkanolamines (III) alkoxylated in this way thus have terminal polypropylene oxide blocks. In the above formula, x and y are each from 3 to 100, where the y/x ratio is preferably >1. x is preferably from 5 to 50, more preferably from 8 to 30 and y is from 10 to 50, preferably from 20 to 50.

In a second particularly preferred embodiment of the, the polyether side groups are groups comprising ethylene oxide units and propylene oxide units with block structure, which have the general formula $(CH_2CH(CH_3)O)_w(CH_2CH_2O)_zH$, where the ethylene oxide units and the propylene oxide units are also actually incorporated in this sequence, i.e. the initial propoxylation is followed by ethoxylation. The polyalkanolamines (III) alkoxylated in this way thus have terminal polyethylene oxide blocks. In the above formula, w and z are each from 3 to 100, where the z/w ratio is preferably >1.

The synthesis of alkylene oxide units is known to those skilled in the art. Comprehensive details are given, for example, in "Polyoxyalkylenes" in Ullmann's Encyclopedia of Industrial Chemistry, $6^{th}$ Edition, Electronic Release.

Preference is given to undertaking the alkoxylation in the presence of a customary basic catalyst, for example alkali metal hydroxides, preferably potassium hydroxide, or alkali metal alkoxides, for example, sodium methoxide. In addition, it is also possible to use double metal cyanide catalysts (DMC catalysts). Suitable DMC catalysts are disclosed, for example, in DE 102 43 361 A1, especially paragraphs [0029] to [0041] and the literature cited therein. The alkoxylation can be undertaken, in a manner known in principle, in a pressure reactor at from 40 to 250° C., preferably from 80 to 200° C. and more preferably from 100 to 150° C. For the correct metered addition of the alkylene oxides, it is advisable, before the alkoxylation, to determine the number of OH groups and if appropriate, the number of (secondary) amino groups of the polyalkanolamine (II).

Stage (C)

The resulting alkoxylated polyalkanolamines (III) can optionally be functionalized in a further reaction step (C). An additional functionalization can serve to modify the properties of the alkoxylated polyalkanolamines (III). To this end, the hydroxyl groups and/or amino groups present in the alkoxylated polyalkanolamines (III) are converted by means of suitable agents which are capable of reaction with hydroxyl groups and/or amino groups. This forms functionalized alkoxylated polyalkanolamines.

For example, the tertiary amino groups present in the alkoxylated polyalkanolamine can be protonated or quaternized by means of suitable alkylating agents.

The terminal hydroxyl groups of the polyalkoxy groups can be reacted with suitable reagents for derivatization, which forms groups of the general formula -(alkoxy)$_n$-X where X is any desired group. The type of functionalization depends on the desired end use. According to the functionalizing agent, the chain end can be hydrophobized or more strongly hydrophilized.

The terminal hydroxyl groups can be esterified, for example, with sulfuric acid or derivatives thereof, so as to form products with terminal sulfate groups. Analogously, products having terminal phosphorus groups can be obtained with phosphoric acid, phosphorous acid, polyphosphoric acid, POCl$_3$ or P$_4$O$_{10}$.

The terminal groups can also be esterified with carboxylic acids, so as to form polymers, which have carboxylic ester-terminated polyalkoxy groups of the general formula -(alkoxy)$_n$-OC(O)—R$^6$. R$^6$ is preferably aliphatic, saturated or unsaturated, linear or branched hydrocarbon radicals having from 1 to 30 carbon atoms, preferably from 6 to 20 carbon atoms, in which nonadjacent carbon atoms may optionally also be substituted by oxygen or nitrogen atoms. R$^6$ is preferably purely hydrocarbon radicals, more preferably linear R$^6$ radicals. For the esterification, it is possible, for example, to use monocarboxylic acids such as dodecanoic acid, hexadecanoic acid, octadecanoic acid or 9-dodecenoic acid.

In addition, the terminal OH groups may also be etherified, so as to form ether-terminated polyalkoxy groups of the general formula -(alkoxy)$_n$-O—R$^6$, where R$^6$ is as defined above.

The R$^6$ groups, especially R$^6$ groups having from 6 to 20 carbon atoms, hydrophobize the chain end. Such a hydrophobization is advisable especially if the alkoxy group is a group with block structure, in which the polypropylene oxide is arranged terminally.

Use of the Alkoxylated Polyalkanolamines for Demulsification

According to the invention, the alkoxylated polyalkanolamines prepared are used to split oil-water emulsions, especially crude oil emulsions. The term "oil-water emulsions" in this context shall comprise both water-in-oil and oil-in-water emulsions. The oil-water emulsions may comprise, for example, from 0.1 to 99% by weight of water, or salt water. The demulsifiers used in accordance with the invention can preferably be used to separate oil-water emulsions, preferably crude oil-water emulsions, with a water or saltwater content of from 1 to 98% by weight, more preferably from 5 to 97% by weight and most preferably from 10 to 95% by weight. The oil components may be oil components of any origin.

The alkoxylated polyalkanolamines are added, preferably in dissolved form, to the oil-water emulsions, especially to the crude oil emulsions, for splitting. The solvents used may include water, alcohols, such as methanol, ethanol, propanol, isopropanol, butanol, ethers such as tetrahydrofuran or dioxane, paraffinic solvents such as hexane, cyclohexane, heptane, octane, isooctane or light petroleum fractions, or aromatic solvents such as toluene, xylene or solvent naphtha. Demulsifier concentrations in the solution of from 10 to 90% by weight have been found to be useful.

The amount (in ppm by weight) of the alkoxylated polyalkanolamines used in accordance with the invention, based on the oil content of the crude oil emulsion, is generally from 0.1 ppm to 5000 ppm, preferably from 1 ppm to 3000 ppm, more preferably from 2 ppm to 1000 ppm and especially from 5 ppm to 500 ppm.

Apparatus and processes for splitting crude oil emulsions are known to those skilled in the art. The emulsion is typically split on site, i.e. still on the oilfield. There may be one apparatus at a production borehole or a central apparatus in which the splitting of the crude oil emulsions is undertaken for several production boreholes of an oilfield together.

Even at the temperature of the freshly extracted crude oil emulsion, the splitting proceeds at such a rate that the emulsion can be split as early as en route to processing plant. This broken emulsion is then separated into pure oil and water or saltwater into a separator which is heated if appropriate, and possibly with the aid of an electrical field. The separator may be apparatus which separates only under the influence of gravity, i.e. for example settling tanks, or else other separators, for example, hydrocyclones.

The crude oil emulsion is separated generally at 10-130° C., preferably at 40-90° C.

Since crude oils consist of a mixture of many chemical compounds, it is generally necessary, owing to the different chemical composition of the oil, the water contents and salt contents and the specific conditions of emulsion splitting, such as temperature, duration of emulsion splitting, type of metered addition and interactions with further components of the mixture, to adjust the demulsifier to the specific conditions. A corresponding selection of alkoxylated polyalkanolamines is undertaken by the person skilled in the art according to the separation problem.

The alkoxylated polyalkanolamines used in accordance with the invention can be adjusted to the particular separation problem, for example, by appropriate selection of the polyalkanolamine base skeleton or the length and chemical composition of the terminal polyether group. Advantageously, it is also possible for this purpose to use mixtures of different alkoxylated polyalkanolamines. For example, a series of products of different hydrophilicity can be synthesized. Adjustment to the specific separation problem can be effected easily by changing only the quantitative ratio of two or more alkoxylated polyalkanolamines. The hydrophilicity can be adjusted easily by the variation of the EO/PO ratio in the polyether groups. It has been found to be particularly useful to use alkoxylated polyalkanolamines, in which the polyoxyalkylene groups have block structure. In this context, it has been found to be useful to use polyethylene oxide-polypropylene oxide blocks to separate oil-in-water emulsions and polypropylene oxide-polyethylene oxide blocks to separate water-in-oil emulsions, without any intention that the invention thus be fixed to this assignment.

The alkoxylated polyalkanolamines used in accordance with the invention can of course also be used in a mixture with other crude oil demulsifiers. Further crude oil demulsifiers may, for example, be oxyalkylated phenol-formaldehyde resins, EO/PO block copolymers or EO/PO block copolymers crosslinked with adipic acid, crosslinked diepoxides, polyamides or alkoxylates thereof, salts of sulfonic acids or ethoxylated and/or propoxylated polyethylenimines. Preference may be given to using EO/PO block copolymers, EO/PO-block copolymers esterified with adipic acid, or ethoxylated and/or propoxylated polyethylenimines. Corresponding crude oil demulsifiers are disclosed, for example, in DE 25 40 173 or EP 541 018 B1. Particularly advantageously, the alkoxylated polyalkanolamines used in accordance with the invention can also be combined with proteins for emulsion splitting, especially with hydrophobins. Further details of hydrophobins as emulsion splitters are disclosed by WO 2006/103251.

The invention is illustrated in detail by the examples which follow.

Preparation of the Alkoxylated Polyalkanolamines

The polyalkanolamines (II) were prepared in accordance with the literature (EP441198, U.S. Pat. No. 5,393,463, Examples 1-3) by condensing alkanolamines in the presence of hypophosphorous acid.

Reaction Stage (A): Preparation of Polyalkanolamines

EXAMPLES 1 TO 4

Preparation of Triethanolamine Condensates 1499.7 g of triethanolamine and 9.75 g of hypophosphorous acid (50% strength in water) are heated to 227° C. with stirring and while passing through a gentle nitrogen stream. The water of reaction formed is distilled off. After a stirring time of 3-8 h, the reaction is stopped by cooling to room temperature. According to the stirring time, a triethanolamine condensate of different viscosity is obtained.

The reaction times and analytical data are reported in Table 1.

TABLE 1

| Preparation of triethanolamine condensates | | | | | |
|---|---|---|---|---|---|
| No. | Reaction time [h] | Viscosity [mPas] | Number average $M_n$ [g/mol] | Weight average $M_w$ [g/mol] | $M_w/M_n$ | OH number [mg KOH/g] |
| Example 1 | 3.5 | 3145 | 3200 | 5700 | 1.8 | |
| Example 2 | 4.5 | 4490 | 3700 | 7800 | 2.1 | |
| Example 3 | 7.0 | 8260 | 4400 | 13500 | 3.1 | 490 |
| Example 4 | 7.5 | 10060 | 4400 | 14300 | 3.3 | 457 |

EXAMPLE 5

Preparation of a Triethanolamine-Glycerol Condensate 746.0 g of triethanolamine, 460.5 g of glycerol and 9.7 g of hypophosphorous acid (50% strength in water) were stirred at 227° C. for 7.0 h in the presence of a gentle nitrogen stream. The water of reaction was distilled off. The reaction mixture was cooled to room temperature. A yellow liquid was obtained (hydroxyl number: 830 mg KOH/g).

Reaction Stage (B): Alkoxylation

EXAMPLE 6

Triethanolamine Condensate +24 EO +24 PO Per OH 100.5 g of the triethanolamine condensate according to Example 3 were introduced into an autoclave with 3.8 g of a 40% aqueous potassium hydroxide solution. After dewatering under reduced pressure at 120° C., 926.9 g of ethylene oxide were injected at 130° C. To complete the reaction, stirring was continued at 130° C. for 2 h. The reaction mixture was stripped with nitrogen and volatile components were removed under reduced pressure. 1031.6 g of a brown solid were obtained. 521.0 g of this material were initially charged in an autoclave, and 617.3 g of propylene oxide were injected at 140° C. within 10 h. To complete the reaction, stirring was continued at 140° C. for 2 h. The reaction mixture was stripped with nitrogen and volatile components were removed under reduced pressure. 1146 g of a light brown solid were obtained (amine titer 0.4820 mmol/g).

EXAMPLE 7

Triethanolamine Condensate +10 EO+30 PO Per OH 150 g of the triethanolamine condensate according to Example 4 were introduced into an autoclave with 8.4 g of a 40% aqueous potassium hydroxide solution. After dewatering at 120° C. under reduced pressure, 536.9 g of ethylene oxide were injected at 130° C. within 6 h. To complete the reaction, stirring was continued at 130° C. for 5 h. The reaction mixture was stripped with nitrogen and volatile components were removed under reduced pressure. 692.0 g of a brown solid were obtained. 225.2 g of this material were initially charged in an autoclave, and 696.0 g of propylene oxide were injected at 140° C. within 10 h. To complete the reaction, stirring was continued at 140° C. for 2 h. The reaction mixture was stripped with nitrogen and volatile components were removed under reduced pressure. 923 g of a light brown liquid were obtained.

EXAMPLE 8

Triethanolamine-Glycerol Condensate+10 EO +30 PO Per OH 121.7 g of the triethanolamine-glycerol condensate according to Example 5 (OH number: 830 mg KOH/g) were introduced into an autoclave with 11.1 g of a 40% aqueous potassium hydroxide solution. After dewatering under reduced pressure at 120° C., 792.0 g of ethylene oxide were injected at 120° C. within 8 h. To complete the reaction, stirring was continued at 120° C. for 5 h. The reaction mixture was stripped with nitrogen, and volatile components were removed under reduced pressure. 925.0 g of a brown liquid were obtained. 204.8 g of this material were initially charged in an autoclave, and 696.0 g of propylene oxide were injected at 140° C. within 10 h. To complete the reaction, stirring was continued at 140° C. for 2 h. The reaction mixture was stripped with nitrogen and volatile components were removed under reduced pressure. 925 g of a brown liquid were obtained.

Test of the Alkoxylated Polyalkanolamines for Splitting Crude Oil-Water Emulsions Testing of the suitability of the inventive alkoxylated polyalkanolamines as a demulsifier by measuring the splitting of water from a crude oil emulsion.

5 g of the demulsifier to be tested were weighed into a 100 ml standard flask which was filled with 3:1 xylenel/isopropanol mixture (based on volume) up to the ring mark and the polymer was dissolved therein by shaking.

A crude oil emulsion from Wintershall AG, Emlichheim, probes 25, 83, 87, 109, 301, 507 (1:1:1:1:1:2) with a water content of 53% by volume was heated to a temperature of 52°

C. in a vessel which had not been sealed firmly in a water bath for approx. 2 h. The crude oil emulsion was homogenized by shaking for approx. 30 sec, then 100 ml in each case of the oil emulsion were introduced into 100 ml shaking cylinders. The oil-filled shaking cylinders were introduced into the water bath.

An Eppendorf pipette was used to dose 50 µl in each case of the 5% by weight solution of the demulsifier to be tested into the shaking cylinder comprising crude oil emulsion, and the cylinder was sealed with the glass stopper (25 mg of demulsifier/l of emulsion; approx. 250 ppm). The shaking cylinder was taken out of the water bath, shaken 60 times and decompressed. The shaking cylinder was then placed back into the water bath and the timer was started. The volume of the water which now separates out was read off after 15, 30, 45, 60, 120 and 240 min. The results are compiled in Table 2.

TABLE 2

Results of the demulsification tests

| No. | | Water separation in ml | | | | | |
|---|---|---|---|---|---|---|---|
| | | 15 min | 30 min | 45 min | 60 min | 120 min | 240 min |
| C1 | No demulsifier | 0 | 0 | 1 | 3 | 20 | 32 |
| C2 | Example 3, no alkoxylation | 0 | 0 | 1 | 3 | 16 | 29 |
| Example 6 | 24 EO + 24 PO | 0 | 2 | 8 | 13 | 29 | 36 |
| Example 7 | 10 EO + 30 PO | 10 | 25 | 32 | 34 | 37 | 40 |
| Example 8 | 10 EO + 31 PO | 15 | 26 | 28 | 30 | 33 | 37 |

The examples and comparative examples show that the nonalkoxylated polyalkanolamines known for the separation of oil-in-water emulsions with low oil content exhibit no effect in the splitting of the present water-in-oil emulsion with approx equal proportions of water and oil. However, the alkoxylation of the polyalkanolamines affords very effective demulsifiers. When the alkoxylated products are used, the amount of water separated out rises very significantly, especially in the case of short periods.

The invention claimed is:

1. A method of splitting oil-water emulsions, comprising adding polyalkanolamines to an oil-water emulsion, wherein polyalkanolamines are alkoxylated polyalkanolamines (III) which are obtained by the following process:
   (A) condensing at least one trialkanolamine of the general formula $N(R^1—OH)_3$ (Ia) and/or at least one dialkanolamine of the general formula $R^2—N(R^1—OH)_2$ (Ib) to give a polyalkanolamine (II),
   where
      the $R^1$ radicals are each independently a divalent, linear or branched aliphatic hydrocarbon radical having from 2 to 6 carbon atoms,
      the $R^2$ radicals are each hydrogen and/or linear or branched aliphatic, cycloaliphatic and/or aromatic hydrocarbon radicals having from 1 to 30 carbon atoms, and
      the resulting polyalkanolamines (II) have a mean molar mass of from 1000 g/mol to 20 000 g/mol,
   (B) alkoxylating the resulting polyalkanolamine (II) with ethylene oxide and propylene oxide to form alkoxylated polyalkanolamines (III) which contains polyoxyalkylene groups, where
      the polyoxyalkylene groups formed have block structure of the general formula $—(CH_2CH_2O)_x(CH_2CH(CH_3)O)_yH$, and where x and y are each from 3 to 100, and the y/x ratio is >1.

2. The method according to claim 1, wherein (Ia) is at least one trialkanolamine selected from the group of triethanolamine, triisopropanolamine and tributan-2 olamine.

3. The method according to claim 2, wherein at least one component (Ic) having two hydroxyl and/or amino groups is used additionally for the condensation in an amount of not more than 50% by weight based on the amount of all components used for the condensation.

4. The method according to claim 2, wherein the alkoxylated polyalkanolamines (III) are converted in a further process step (C) by means of suitable reagents which are capable of reaction with hydroxyl groups and/or amino groups.

5. The method according to claim 2, wherein the emulsion is a crude oil emulsion.

6. The method according to claim 1, which further comprises using at least one component (Ic) having two hydroxyl and/or amino groups for the condensation in an amount of not more than 50% by weight based on the amount of the components used for the (A) condensing.

7. The method according to claim 6, wherein the alkoxylated polyalkanolamines (III) are converted in a further process step (C) by means of suitable reagents which are capable of reaction with hydroxyl groups and/or amino groups.

8. The method according to claim 6, wherein the emulsion is a crude oil emulsion.

9. The method according to claim 6, wherein at least one component (Ic) comprises polyols of the general formula $R^3(OH)_n$, where n is a natural number from 2 to 4 and $R^3$ is an n-valent linear or branched aliphatic, cycloaliphatic or aromatic hydrocarbon radical having from 2 to 10 carbon atoms.

10. The method according to claim 9, wherein the alkoxylated polyalkanolamines (III) are converted in a further process step (C) by means of suitable reagents which are capable of reaction with hydroxyl groups and/or amino groups.

11. The method according to claim 9, wherein the emulsion is a crude oil emulsion.

12. The method according to claim 1, wherein x is from 8 to 30 and y is from 20 to 50.

13. The method according to claim 12, wherein the alkoxylated polyalkanolamines (III) are converted in a further process step (C) by means of suitable reagents which are capable of reaction with hydroxyl groups and/or amino groups.

14. The method according to claim 12, wherein the emulsion is a crude oil emulsion.

15. The method according to claim 1, wherein the alkoxylated polyalkanolamines (III) are converted in a further process step (C) by means of suitable reagents which are capable of reaction with hydroxyl groups and/or amino groups.

16. The method according to claim 15, wherein the terminal hydroxyl groups of the polyoxyalkylene groups are etherified and/or esterified.

17. The method according to claim 16, wherein the polyoxyalkylene groups are those of the general formula $-(alkoxy)_n-OC(O)—R^6$ or $-(alkoxy)_n-O—R^6$, where $R^6$ is an aliphatic, saturated or unsaturated, linear or branched hydrocarbon radical having from 1 to 30 carbon atoms.

18. The method according to claim 1, wherein the emulsion is a crude oil emulsion.

19. The method according to claim 18, wherein the crude oil emulsion has a water content of from 10 to 95% by weight of water based on the sum of all components of the emulsion.

20. The method according to claim 1, wherein the alkoxylated polyalkanolamines are used in combination with at least one further emulsion splitter.

* * * * *